US 6,708,101 B2

(12) United States Patent
Umemoto

(10) Patent No.: US 6,708,101 B2
(45) Date of Patent: Mar. 16, 2004

(54) POWER SUPPLY SYSTEM FOR CONTROL UNIT OF INTERNAL COMBUSTION ENGINE

(75) Inventor: Hideki Umemoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 221 days.

(21) Appl. No.: 09/996,794

(22) Filed: Nov. 30, 2001

(65) Prior Publication Data

US 2002/0188396 A1 Dec. 12, 2002

(30) Foreign Application Priority Data

Jun. 7, 2001 (JP) ........................................ 2001-172704

(51) Int. Cl.[7] .............................. G06G 7/70; G06F 19/00
(52) U.S. Cl. ........................ 701/102; 123/650; 701/114; 701/107
(58) Field of Search ................................ 701/102, 114, 701/101, 107; 123/650

(56) References Cited

U.S. PATENT DOCUMENTS 5,815,827 A * 9/1998 Tomisawa et al. .......... 701/101
6,163,082 A * 12/2000 Yoshida et al. ............. 307/10.1
6,232,674 B1 * 5/2001 Frey et al. .................. 307/10.1
6,561,016 B1 * 5/2003 Suhre et al. ................. 73/118.2
6,595,179 B1 * 7/2003 Kanno ..................... 123/198 D

FOREIGN PATENT DOCUMENTS

JP      3-209168    9/1991    ............. G01P/3/42
JP      3-210052    9/1991    ............ F02D/45/00

* cited by examiner

Primary Examiner—Willis R. Wolfe
Assistant Examiner—Johnny H. Hoang
(74) Attorney, Agent, or Firm—Sughrue Mion, PLLC

(57) ABSTRACT

A power supply system for a control unit of an internal combustion engine is provided which is capable of holding an engine controllable state after starting of the engine until the engine is stopped. A relay with a self holding function is inserted in a power supply line exclusively used for supplying electric power from a battery to the internal combustion engine control unit and its related devices. A relay drive and hold circuit 11 receives a relay drive signal and a main switch signal, drives and holds the relay 8 into a power supplying state as long as at least one of the main switch and the relay drive signal from an arithmetic processing section is input to the relay drive and hold circuit.

3 Claims, 5 Drawing Sheets

FIG. 5

|  | USUAL (NORMAL) |
|---|---|
| STOP SWITCH | OPEN (OFF) |
| MAIN SWITCH | CONNECTED (ON) |

POWER SUPPLY SYSTEM FOR CONTROL UNIT OF INTERNAL COMBUSTION ENGINE

This application is based on Application No. 2001-172704, filed in Japan on Jun. 7, 2001, the contents of which are hereby incorporated by reference.

BACKGROUND OF THE INVENTION

1. Field of the Invention

The present invention relates to a control unit for an internal combustion engine, and more particularly to a power supply system for an internal combustion engine control unit.

2. Description of the Related Art

FIG. 4 illustrates the configuration of such a kind of known power supply system for a control unit of an internal combustion engine, in particular for marine use. In this figure, a hull 1 of a marine vessel or boat includes a stop switch 4 which is depressed into a connected (on) state to generate a signal representative of that state when the driver indicates his or her intent of stopping driving, a main switch which is depressed into a connected (on) state to generate a signal representative of that state when the driver indicates his or her intent of driving, a battery 6 for supplying electric power to respective devices of the marine vessel including an outboard unit 2, and a connector 7 for connecting a power supply line from the battery 6 to the outboard unit 2 as well as various signal lines from the stop switch 4, the main switch 5 and other devices (not shown) to the outboard unit 2.

In this connection, note that the stop switch 4 is normally in an open (off) state, whereas the main switch 5 is normally in a connected (on) state, as illustrated in FIG. 5.

The outboard unit 2 includes an internal combustion engine control unit (ECU) 3 with a built-in CPU (not shown) for detecting the above signal states and controlling the related devices (not shown in particular) installed on the outboard unit 2 thereby to perform various control operations such as ignition timing control, injection amount control, etc.

In the marine vessel, an operation panel, which is operated by the driver, is arranged at the front portion of the hull 1, and it is necessary to arrange signal-related component parts such as the main switch 5 acting as a power switch, the stop switch 4, a throttle (not shown), etc., on the operation panel. Accordingly, these signal-related component parts are connected with the ECU 3 installed on the outboard unit 2 through one or more harnesses 12 of a several meter length.

That is, the signals from the main switch 5 and the stop switch 4 as well as the power supply from the battery 6 are input to the ECU 3 through the connector 7 and the harness 12 so that various control operations are carried out by the ECU 3.

With the known power supply system for a control unit of an internal combustion engine as constructed above, the outboard unit 2 in the form of a marine internal combustion engine (hereinafter simply referred to as engine) is used on the surface of water such as a sea, a lake or the like, and hence corrosion is liable to take place on the various kinds of harnesses. Particularly, the connecting portions of the harnesses at which connectors are used for frequent connections and disconnections are easily subjected to corrosion.

When corrosion has occurred, reliability in the signal transmission at the connecting portions reduces, giving rise to a situation in which the signal transmission may be abnormal. If such corrosion is generated in the power supply line supplying power to the ECU and the like, which controls the engine, there will be a possibility that the engine can not be started or stops suddenly.

With a recent engine equipped with a fuel injection system, the engine can not be operated if not properly supplied with power. On the other hand, with an old or former engine employing a carburetor and a CDI ignition device, the entire system is constructed such that the engine can be operated without any battery power supply, and hence the influence of corrosion is limited. However, since a recent emission control compliant model adopts fuel injection, the power supply from a battery is required. Therefore, the degree of influence of the above-mentioned corrosion is increasing.

As described above, the power supply harness for supplying electric power from the power supply in the hull to the ECU, etc., in the outboard unit becomes long due to the construction that the hull and the outboard unit are arranged apart from each other. In addition, it is necessary to arrange the signal harness for signal transmission between the ECU of the outboard unit and the main switch, the stop switch, the throttle, etc., in the operation panel at the front portion of the hull in such a manner that the signal harness extending from the inboard elements in the operation panel is connected through the connector with the ECU, etc., in the outboard unit.

Thus, there is a problem that reduction in the reliability of the harnesses may frequently take place at the connectors, and hence in the worst case, the power supply to the ECU, etc., in the outboard unit may be stopped due to contact failure such as an instantaneous power interruption, etc.

Moreover, an additional problem is that if the engine is stopped suddenly and can not be restarted due to contact failure at the connectors or the like of the harnesses after a marine vessel or boat installing the engine has departed from a port, the marine vessel will not be able to return to the port, thus leading to a distress and a serious influence on the lives of passengers.

SUMMARY OF THE INVENTION

The present invention is intended to obviate the problems as referred to above and has for its object to provide a power supply system for a control unit of an internal combustion engine which has the function of maintaining the power supply to an internal combustion engine control unit and its related devices after an internal combustion engine has once been started until an ECU detects a driver's intent of stopping the engine, thereby holding the engine in an operable condition thereof.

Bearing the above object in mind, the present invention rsides in a power supply system for a control unit of an internal combustion engine, comprising: a power supply line exclusively used for supplying electric power from a battery to an internal combustion engine control unit and its related devices; a relay having a self holding function and inserted in the power supply line for switching between supplying and interruption of electric power; and the internal combustion engine control unit adapted to receive electric power from the battery through the power supply line. The internal combustion engine control unit comprises: an arithmetic processing section which performs arithmetic processing for various control operations of the internal combustion engine control unit, receives a main switch signal representative of an on/off state of a main switch, which is in an on state during operation of the internal combustion engine, and a stop switch signal representative of an on/off state of a stop switch, which is made into an on state when the internal combustion engine is stopped, outputs and holds a relay drive signal when the main switch signal indicates the on state of the main switch, and stops outputting the relay drive signal when the stop switch signal indicates the on state of the stop switch; and a relay drive and hold circuit which receives the relay drive signal and the main switch signal, drives the relay into a power supplying state and holds this state as long as at least one of the main switch signal indicating the on state of the main switch and the relay drive signal from the arithmetic processing section is input to the relay drive and hold circuit.

In a preferred form of the present invention, the battery is arranged at a location apart from the internal combustion engine control unit and the relay, and the power supply line is directly connected from the battery to an internal combustion engine control unit side.

In another preferred form of the present invention, the power supply system is used for a marine internal combustion engine control unit of a marine vessel. The battery is arranged in a hull of the marine vessel, and the internal combustion engine control unit and the relay are arranged in the outboard unit. The power supply line comprises a harness which is directly connected from a hull side to an outboard unit side.

In the present invention, a power supply system is constructed such that it includes a stop switch indicating a driver's intent of stopping driving for example and usually generating an open signal representative of an open (off) state thereof, a main switch indicating a driver's intent of driving for example and usually generating a connection signal representative of a connected (on) state thereof, a relay for supplying electric power from a battery to an internal combustion engine control unit and various kinds of related sensors and actuators, and an ECU having a CPU incorporated therein for detecting engine operating conditions such as the number of revolutions per minute of the engine, the engine temperature, etc., based on signals from the various kinds of sensors. Here, the relay for supplying electric power to the internal combustion engine control unit and its related respective devices is constructed such that it is driven to operate under the control of the ECU, whereby the engine is held in an operable state until the driver has the intent of stopping the engine.

With such a construction, even when corrosion occurs in various kinds of signal harnesses or the like, causing contact failure, breaks, etc., it is possible to ensure the supply of electric power to the internal combustion engine control unit and its related various devices, thus permitting the engine to be driven to operate even in such a situation. As a result, it is possible to prevent the engine from being stopped against a driver's will and becoming unable to restart.

The above and other objects, features and advantages of the present invention will become more readily apparent to those skilled in the art from the following detailed description of preferred embodiments of the present invention taken in conjunction with the accompanying drawings.

BRIEF DESCRIPTION OF THE DRAWINGS

FIG. 5 is a view illustrating a main switch and a stop switch in their usual or normal states.

DESCRIPTION OF THE PREFERRED EMBODIMENT

Now, a preferred embodiment of the present invention will be described in detail while referring to the accompanying drawings.

Embodiment 1

Figure 1:
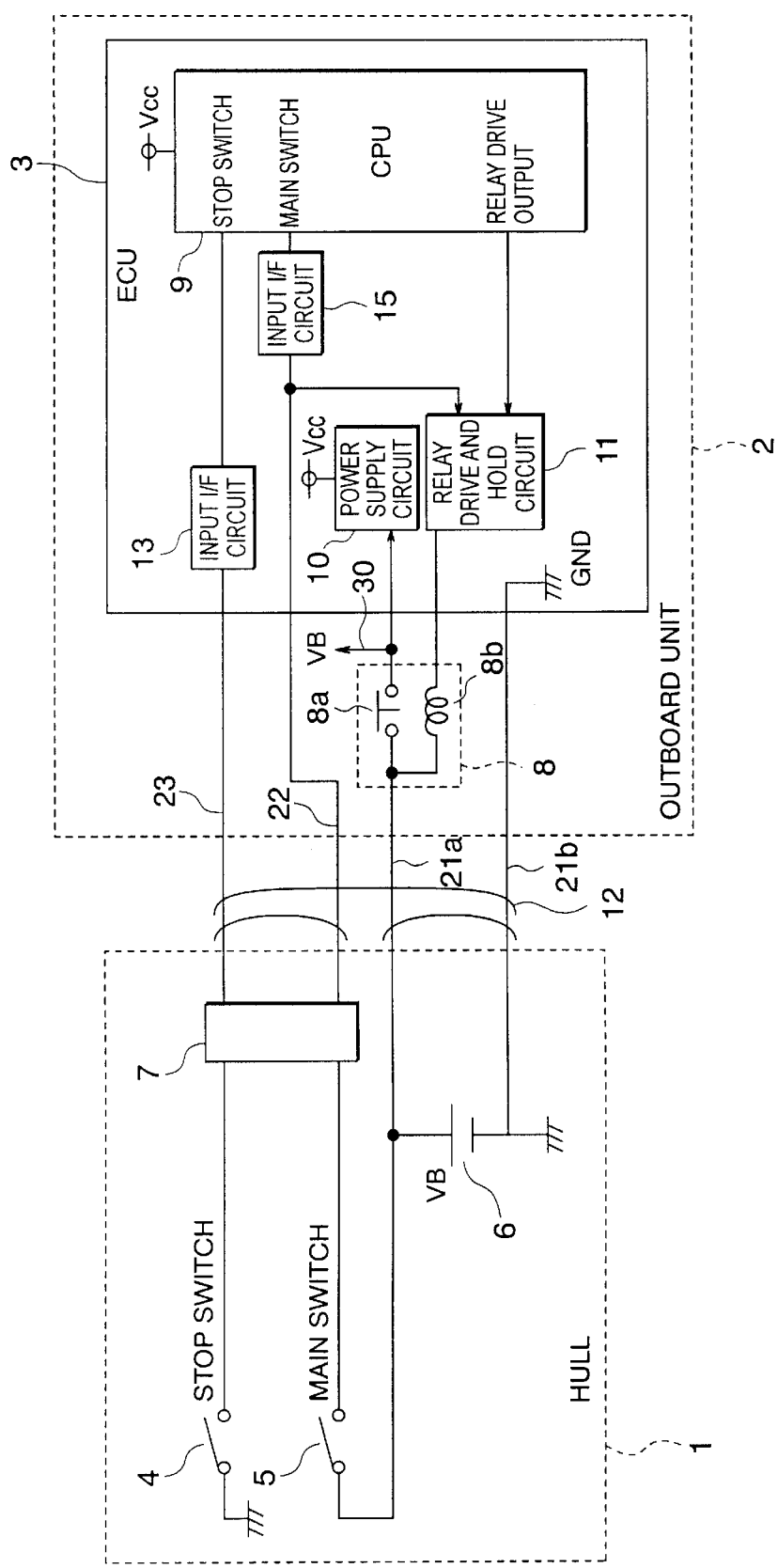
FIG. 1 is a view illustrating the configuration of a power supply system for a control unit of an internal combustion engine according to one embodiment of the present invention.

FIG. 1 illustrates the configuration of a power supply system for a control unit of an internal combustion engine, in particular for marine use, according to one embodiment of the present invention. In this figure, the same or corresponding parts as those of the above-mentioned known power supply system are identified by the same symbols. In FIG. 1, a hull 1 of a marine vessel includes a stop switch 4 which is adapted to be depressed into a connection (on) state to output a stop switch signal representative of this state when the driver indicates his or her intent of stopping the operation of an unillustrated internal combustion engine (hereinafter sometimes also referred to as an engine) installed in an outboard unit 2, a main switch 5 which is adapted to be depressed to output a main switch signal representative of this state when the driver indicates his or her intent of driving the engine, a battery 6 for supplying electric power to respective devices of the marine vessel including an internal combustion engine control unit 3 and its related devices on an outboard unit 2 side, and a connector 7 for connecting various signal lines extending from the stop switch 4, the main switch 5, other devices (not shown), etc., with the outboard unit 2 side.

Here, note that the stop switch 4 is usually or normally in an open (off) state, and the main switch 5 is usually or normally in a connected (on) state, as illustrated in FIG. 5.

A plurality of harnesses 12 are provided for connecting between the hull 1 and the outboard unit 2. The harnesses 12 comprise a signal harness, which is shown at an upper side in FIG. 1, and a power supply harness, which is shown at a lower side in FIG. 1. The signal harness is used for signal transmission, includes a main switch signal line 22, a stop switch signal line 23, etc., and is provided with a connector 7 for connection of these signal lines. The power supply harness is exclusively used for power supply, includes power supply lines 21a, 21b, and serves to directly connect between the hull 1 and the outboard unit 2.

The outboard unit 2 equipped with the engine includes the internal combustion engine control unit (ECU) 3 which detects the states of signals supplied thereto from the hull 1 side and controls its related devices (not shown in particular) arranged in the outboard unit 2 thereby to perform various control operations such as ignition timing control, injection amount control, etc. The outboard unit 2 further includes a relay 8 which is inserted in the power supply line 21a for switching between the supply and interruption of electric power. The relay 8 has a self holding function and includes a contact 8a and an exciting coil 8b. A reference numeral 30 designates the supply of power from the power supply line 21a to the devices (not shown in particular) which are related to the ECU 3 and arranged in the outboard unit 2.

The ECU 3 includes a CPU 9 which acts as an arithmetic processing section to perform arithmetic processing for various kinds of control operations of the ECU 3, and control the driving of the relay 8 in accordance with the operating states of the main switch signal line 22 and the stop switch signal line 23, a power supply circuit 10 for the CPU 9 acting to drop a battery voltage VB into a power supply voltage Vcc suitable for the CPU 9, a relay drive and hold circuit 11 for driving the relay 8 into a connected state and holding this state in accordance with signals from the main switch signal line 22 and the CPU 9, and input I/F circuits 13, 15 for the stop switch signal line 23 and the main switch signal line 22, respectively.

Figure 2:
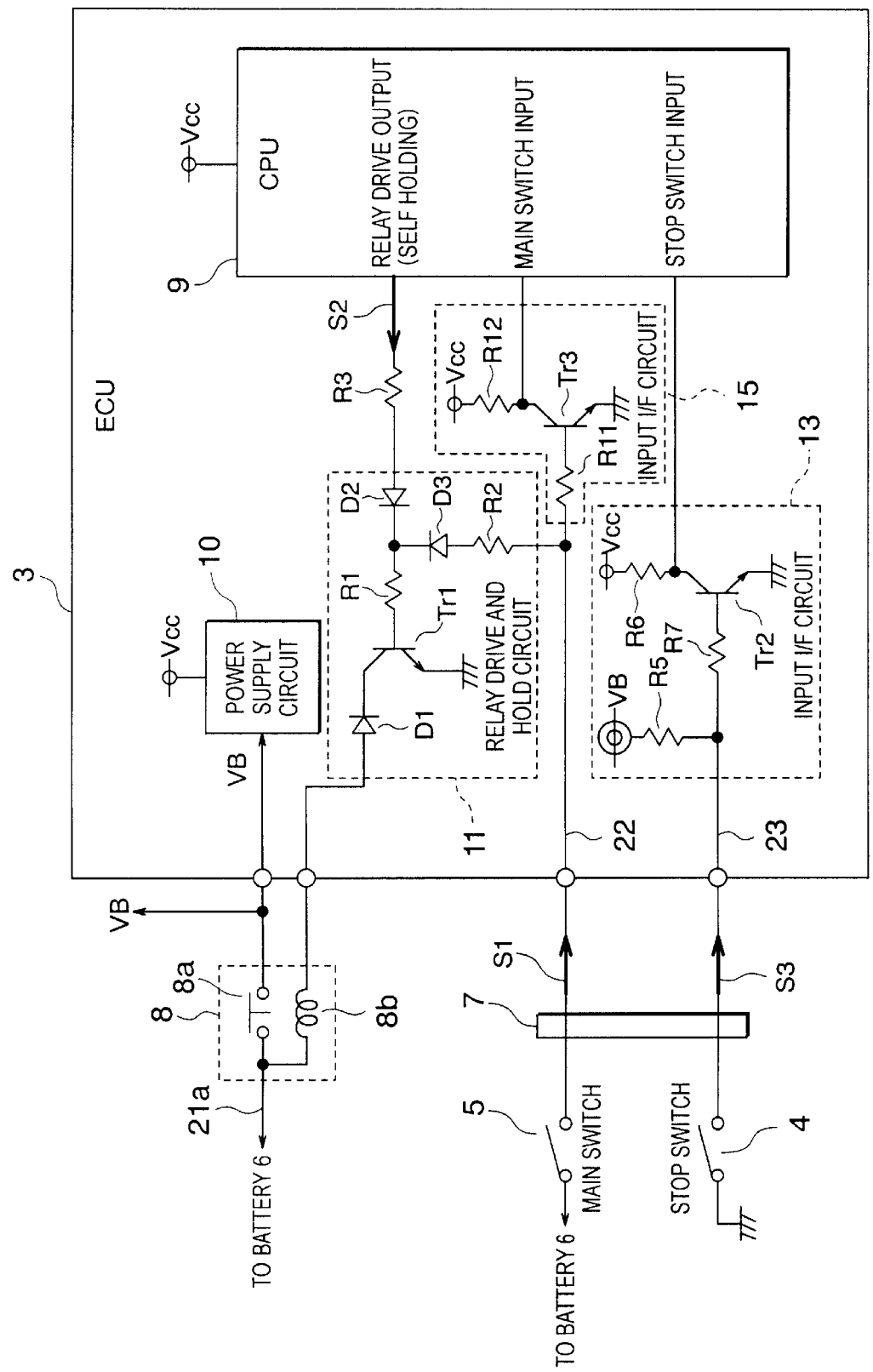
FIG. 2 is a view illustrating one example of the circuit structure of a relay drive and hold circuit and input I/F circuits of FIG. 1.

FIG. 2 illustrates one example of the circuit structure of the relay drive and hold circuit 11 and the input I/F circuits 13, 15 of FIG. 1. The relay drive and hold circuit 11 includes a transistor Tr1, a diode D1–D3 for checking counterflow, and resistors R1, R2. Also, the input I/F circuits 13, 15 include transistors Tr2, Tr3, pull-up resistors R5, R6, R12, and resistors R7, R11 connected with the base sides of the transistors Tr2, Tr3, respectively. A transistor R3 is connected with an input of the relay drive and hold circuit 11.

Symbols S1 and S3 on the main switch signal line 22 and the stop switch signal line 23, respectively, designate a main switch signal representative of the on/off state of the main switch 5 and a stop switch signal representative of the on/off state of the stop switch 4, respectively. A symbol S2 designates a relay drive signal output from the CPU 9 to the relay drive and hold circuit 11 for driving the relay 8 to close and permitting electric power to be supplied from the battery 6 to the relay drive and hold circuit 11 thereby to hold the closed state of the relay 8.

Figure 3:
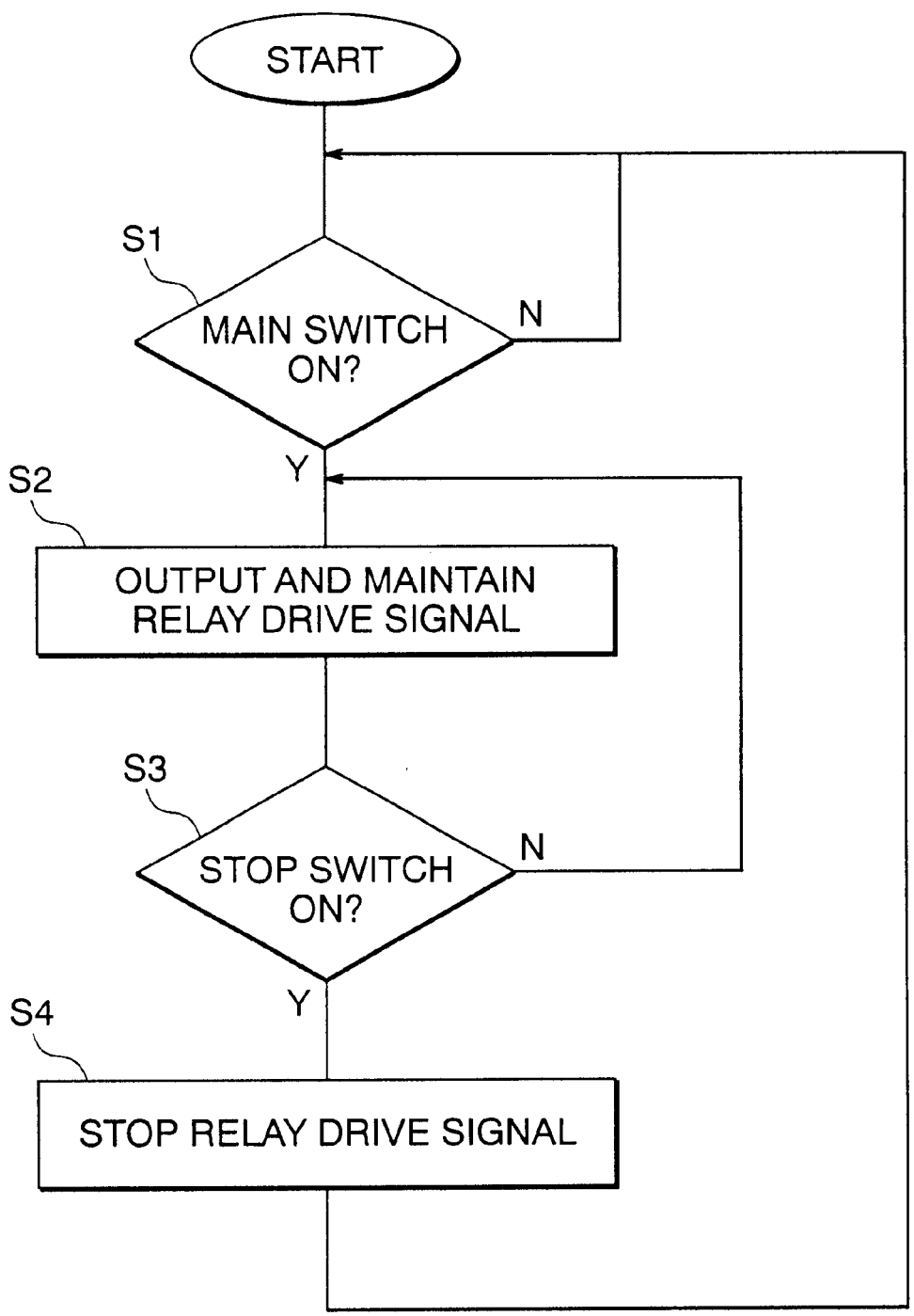
FIG. 3 is a flow chart illustrating one example of the operation of a CPU shown in FIG. 2.
Figure 4:
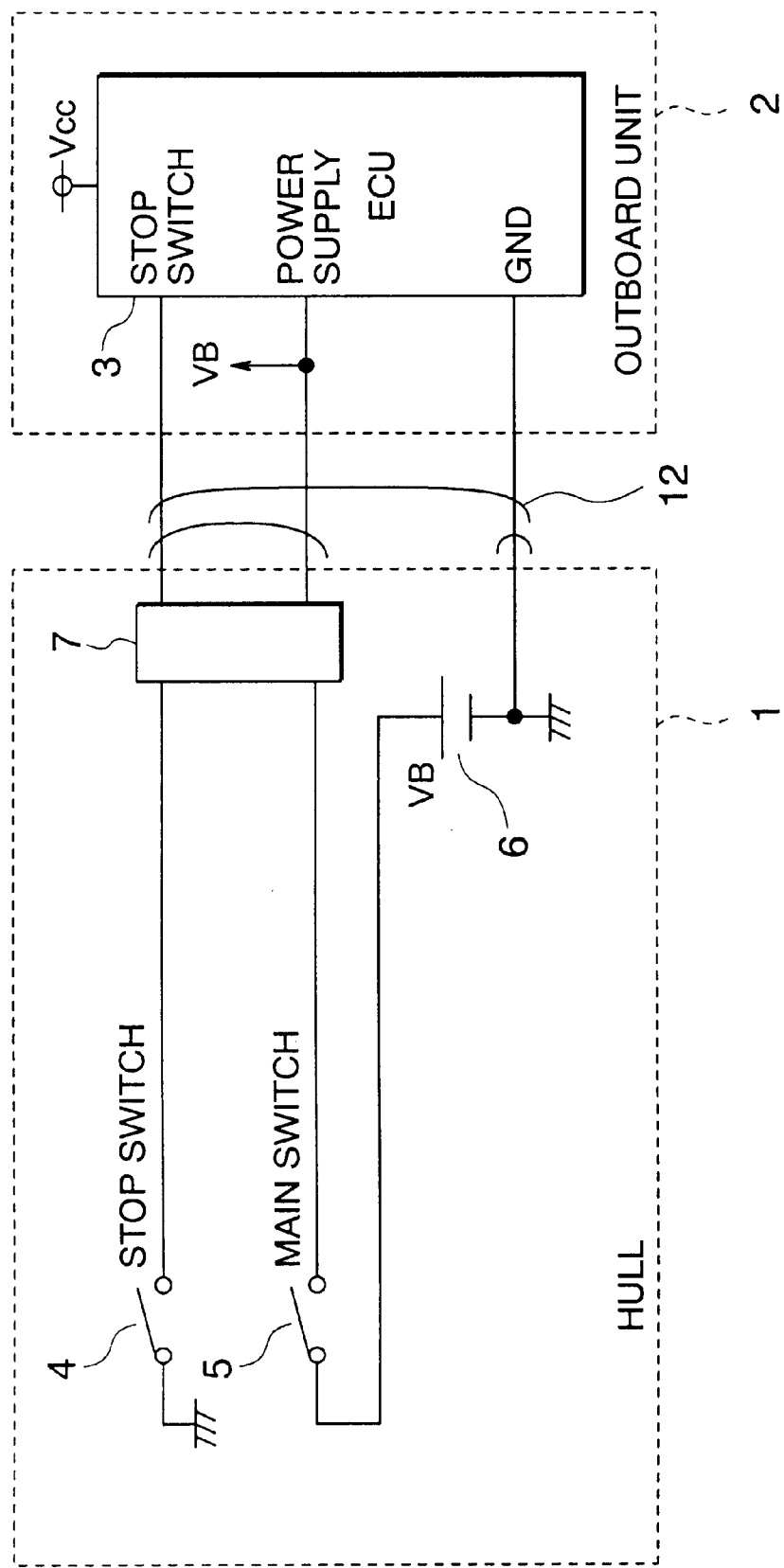
FIG. 4 is a view illustrating the configuration of this kind of known power supply system for a control unit of an internal combustion engine.

FIG. 3 is a flow chart illustrating an exemplary operation of the CPU 9 shown in FIG. 2.

In operation, the main switch signal S1 of the main switch signal line 22 represents the on/off state of the main switch 5, which is in an on state due to the driver's intent during operation of the engine. Also, the stop switch signal S3 of the stop switch signal line 23 represents the on/off state of the stop switch 4, which is made into an on state due to the driver's intent when the engine is stopped.

When the main switch signal S1 indicates the on state of the main switch 5, the transistor Tr1 of the relay drive and hold circuit 11 is turned on so that current flows from the battery 6 into the exciting coil 8b of the relay 8, thereby driving the relay 8 into a closed state. As a result, the ECU 3 and its related devices in the outboard unit 2 receive the power supply from the battery 6.

The CPU 9 performs arithmetic processing for various kinds of control operations of the ECU 3, and receives the main switch signal S1 and the stop switch signal S3. When the main switch signal S1 indicates the on state of the main switch 5 (step S1), the CPU 9 outputs a relay drive signal S2 and at the same time holds this output (step S2). As a result, the closed state of the relay 8 is held.

When the stop switch signal S3 indicates the on state of the stop switch 4 (step S3), the CPU 9 stops outputting the relay drive signal S2 (step S4). Consequently, if the main switch signal S1 indicates the off state of the main switch 5 at this point, the transistor Tr1 of the relay drive and hold circuit 11 is turned off whereby current is stopped flowing to the exciting coil 8b of the relay 8, thus permitting the relay 8 to return to its open state.

That is, the relay drive and hold circuit 11 drives the relay 8 into a power supplying state and at the same time holds this state as long as at least one of the main switch signal S1 representing the on state of the main switch 5 and the relay drive signal S2 from the CPU 9 is input thereto.

Specifically, a self holding function is given to the main switch signal line 22 of the main switch 5 which indicates the driver's intent of driving the outboard unit 2. When the ECU 3 detects a driver's driving intention (driving once, starting of the engine), the ECU 3 continues supplying power to the ECU 3, etc., as a concrete self holding function.

First of all, control is made by the ECU 3 in such a manner that the CPU 9 outputs a relay drive signal S2 to the relay drive and hold circuit 11 when the CPU 9 detects a change from the off state into the on state of the main switch 5 as the detection of a driver's driving intention. Here, note that the CPU 9 acts to continuously output and hold the relay drive signal S2 to the relay drive and hold circuit 11 until the CPU 9 detects the driver's intent of stopping the engine. Concretely, the driver's stopping intent is detected by a change from the off state into the on state of the stop switch 4.

The relay drive and hold circuit 11 of the ECU 3 is constructed to compulsorily turn on the relay 8 when the main switch 5 is turned on, whereby the closed state of the relay 8 can be held in a dual manner. In addition, it becomes possible to hold the closed state of the relay 8 even if the relay drive signal S2 from the CPU 9 for driving the relay 8 into its closed state is lost.

Here, note that it is constructed such that the power supply from the battery 6 to the various kinds of devices such as the ECU 3, etc., of the outboard unit 2 can be continued during the time when the relay 8 is held in the closed state, thus permitting the driver to continue driving the engine.

With the above construction, even in cases where corrosion occurrs in various kinds of harnesses 12 of the outboard unit 2, causing contact failure, breaks, etc., the engine can be driven to operate in a stable manner if a prescribed condition as referred above is established. As a result, it is possible to prevent the problem or danger that the engine is stopped against a driver's will and can not be restarted.

Concretely, even in the event that the harness for the main switch 5 or the stop switch 4 is disconnected or broken after the engine has once been started, it is possible to continue the operation of the engine. In addition, to strengthen the self holding function, the closed state or the on state of the relay 8 is held until the CPU 9 detects that the main switch 5 has changed from an on state into an off state and the stop switch 4 has changed from an off state into an on state after the CPU 9 has detected the starting of the engine. Thus, since the power supply from the battery 6 is held on the outboard unit 2 side, the ECU 3 can control its related devices on the outboard unit 2 side, whereby the engine can be controlled to run without being stopped.

Here, it is to be noted that there may be added a condition in which the main switch 5 has changed into an off state and the stop switch 4 has changed into an on state. That is, a condition may be further added that a signal to be used for controlling the internal combustion engine by means of the CPU 9, for example an engine rpm signal representative of the number of revolutions per minute of the engine, is lost when the engine is stopped.

As described in the foregoing, according to the present invention, a power supply system for a control unit of an internal combustion engine comprises: a power supply line exclusively used for supplying electric power from a battery to an internal combustion engine control unit and its related devices; a relay having a self holding function and inserted in the power supply line for switching between supplying and interruption of electric power; and the internal combustion engine control unit adapted to receive electric power from the battery through the power supply line. The internal combustion engine control unit comprises: an arithmetic processing section which performs arithmetic processing for various control operations of the internal combustion engine control unit, receives a main switch signal representative of an on/off state of a main switch, which is in an on state during operation of the internal combustion engine, and a stop switch signal representative of an on/off state of a stop switch, which is made into an on state when the internal combustion engine is stopped, outputs and holds a relay drive signal when the main switch signal indicates the on state of the main switch, and stops outputting the relay drive signal when the stop switch signal indicates the on state of the stop switch; and a relay drive and hold circuit which receives the relay drive signal and the main switch signal, drives the relay into a power supplying state and holds this state as long as at least one of the main switch signal indicating the on state of the main switch and the relay drive signal from the arithmetic processing section is input to the relay drive and hold circuit. With the above arrangement, the supply of power to the outboard unit is self held by means of signals representative of the normally on state of the main switch and the normally off state of the stop switch, so that even when poor contact, a break or the like takes place in the signal lines, etc., the engine can be driven to operate in a stable manner. Consequently, it is possible to prevent the problem or danger that the engine is stopped against a driver's will and can not be restarted.

Moreover, the battery is arranged at a location apart from the internal combustion engine control unit and the relay, and the power supply line is directly connected from the battery to an internal combustion engine control unit side. Thus, reliability in the supply of electric power to the outboard unit can be further improved.

In addition, the power supply system is used for a marine internal combustion engine control unit of a marine vessel. The battery is arranged in a hull of the marine vessel, and the internal combustion engine control unit and the relay are arranged in the outboard unit. The power supply line comprises a harness which is directly connected from a hull side to an outboard unit side. With this arrangement, it is possible to further improve reliability in supplying electric power to the outboard unit. Furthermore, even in cases where corrosion occurs in various kinds of harnesses of the outboard unit, causing contact failure, breaks, etc., the engine can be driven to operate in a stable manner, thereby making it possible to avoid the problem or danger that the engine is stopped against a driver's will and can not be restarted.

While the invention has been described in terms of a preferred embodiment, those skilled in the art will recognize that the invention can be practiced with modifications within the spirit and scope of the appended claims.

What is claimed is:

1. A power supply system for a control unit of an internal combustion engine, comprising:

a power supply line exclusively used for supplying electric power from a battery to an internal combustion engine control unit and its related devices;

a relay having a self holding function and inserted in said power supply line for switching between supply and interruption of electric power; and said internal combustion engine control unit adapted to receive electric power from said battery through said power supply line;

said internal combustion engine control unit comprising:
an arithmetic processing section which performs arithmetic processing for various control operations of said internal combustion engine control unit, receives a main switch signal representative of an on/off state of a main switch, which is in an on_state during operation of said internal combustion engine, and a stop switch signal representative of an on/off state of a stop switch, which is made into an on_state when said internal combustion engine is stopped, outputs and holds a relay drive signal when said main switch signal indicates the on state of said main switch, and stops outputting said relay drive signal when said stop switch signal indicates the on_state of said stop switch; and
a relay drive and hold circuit which receives said relay drive signal and said main switch signal, drives said relay into a power supplying state and holds this state as long as at least one of said main switch signal indicating the on_state of said main switch and said relay drive signal from said arithmetic processing section is input to said relay drive and hold circuit.

2. The power supply system according to claim 1, wherein said battery is arranged at a location apart from said internal combustion engine control unit and said relay, and said power supply line is directly connected from said battery to an internal combustion engine control unit side.

3. The power supply system according to claim 1, wherein said power supply system is used for a marine internal combustion engine control unit of a marine vessel, and said battery is arranged in a hull of said marine vessel, and said internal combustion engine control unit and said relay are arranged in said outboard unit, and said power supply line comprises a harness which is directly connected from a hull side to an outboard unit side.

* * * * *